United States Patent [19]

Shikakura et al.

[11] Patent Number: 5,043,809
[45] Date of Patent: Aug. 27, 1991

[54] ENCODING APPARATUS

[75] Inventors: Akihiro Shikakura; Koji Takahashi; Yoshiki Ishii; Tomohiko Sasatani, all of Kanagawa, Japan

[73] Assignee: Canon Kabushiki Kaisha, Tokyo, Japan

[21] Appl. No.: 520,957

[22] Filed: May 9, 1990

Related U.S. Application Data

[63] Continuation of Ser. No. 373,618, Jun. 29, 1989, abandoned, which is a continuation of Ser. No. 120,105, Nov. 13, 1987, abandoned.

[30] Foreign Application Priority Data

Nov. 25, 1986 [JP] Japan .................. 61-280278
Nov. 26, 1986 [JP] Japan .................. 61-282325

[51] Int. Cl.$^5$ ............................................. H04N 7/12
[52] U.S. Cl. .................................. 358/133; 358/136; 382/56
[58] Field of Search .............. 358/133, 135, 136, 138; 375/27, 30; 382/56; 364/826; 340/347 DD

[56] References Cited

U.S. PATENT DOCUMENTS

| | | | |
|---|---|---|---|
| 3,984,626 | 10/1976 | Mounts et al. | 358/133 |
| 4,276,544 | 6/1981 | Iinuma | 358/133 |
| 4,288,816 | 9/1981 | Kashioka et al. | 358/138 |
| 4,454,546 | 6/1984 | Mori | 358/133 |
| 4,591,908 | 5/1986 | Hirano | 358/136 |
| 4,679,081 | 7/1987 | Tsugane et al. | 358/136 |
| 4,691,329 | 9/1987 | Jari et al. | 358/133 |
| 4,729,020 | 3/1988 | Schaphorst et al. | 358/133 |
| 4,733,298 | 3/1988 | Koga | 358/138 |

Primary Examiner—John K. Peng
Attorney, Agent, or Firm—Fitzpatrick, Cella, Harper & Scinto

[57] ABSTRACT

The present invention relates to an encoding apparatus for digitizing and encoding an input image signal, the input image signal being sequentially sampled to sequentially form sample signals at respective sample points. The encoding data which respectively correspond to the sample signals at respective sample points are formed, and the plurality of resultant encoding data are sequentially output on a group unit basis of k (k being an integer equal to or greater than 2) encoding data in accordance with the order different from the forming order of the encoding data. In accordance with a combination of the k encoding data which have been output, the k encoding data are converted into the data train having less DC and low frequency components and output, so that the image signal can be highly efficiently encoded.

12 Claims, 9 Drawing Sheets

| PREDICTION ERROR E | OUTPUT BIT PATTERN Do | C D S |
|---|---|---|
| 7 | 1 1 1 1 | + 4 |
| 6 | 0 0 1 0 | − 2 |
| 5 | 0 1 1 1 | + 2 |
| 4 | 0 0 0 1 | − 2 |
| 3 | 1 1 0 1 | + 2 |
| 2 | 0 0 1 1 | 0 |
| 1 | 0 1 0 1 | 0 |
| 0 | 0 1 1 0 | 0 |
| − 1 | 1 0 1 0 | 0 |
| − 2 | 1 1 0 0 | 0 |
| − 3 | 1 0 1 1 | + 2 |
| − 4 | 1 0 0 0 | − 2 |
| − 5 | 1 1 1 0 | + 2 |
| − 6 | 0 1 0 0 | − 2 |
| − 7 | 0 0 0 0 | − 4 |

ENCODING APPARATUS

This application is a continuation of application Ser. No. 07/373,618, filed June 29, 1989, which was a continuation of application Ser. No. 07/120,105, filed Nov. 13, 1987.

BACKGROUND OF THE INVENTION

1. Field of the Invention

The present invention relates to an apparatus for encoding an image data signal such as a television signal or the like and, more particularly, to an encoding apparatus for encoding the image signal by use of a characteristic of the image signal.

2. Related Background Art

For example, a digital VTR or the like is known as a practical apparatus of a prediction encoding system which has conventionally been known. In such a kind of apparatus, to record an image signal or the like having a large amount of information onto a recording medium such as a magnetic tape or the like, the recording is performed by compressing the transmission band of the image data using the correlation of the image data.

On the other hand, in the ordinary magnetic recording apparatus, it is difficult to record and reproduce the very low frequency component or DC component. This point will now be described in detail hereinbelow on the basis of the recording/reproducing principles of a digital VTR.

Recording onto and reproduction from a magnetic tape are performed through a few magnetic heads attached to a rotary cylinder. However, the magnetic head which is ordinarily used performs the recording by converting the time-dependent amount of change (differentiated value) of the magnetic flux into a voltage, or executes the reproduction by reversely converting the voltage into time-dependent amount of change the magnetic flux. Thus, the signal of the DC component or low frequency component is hardly reproduced. Moreover, since the magnetic head is always rotating at a high speed, the supply of the recording signal to the magnetic head and the reception of the reproduced signal from the magnetic head are executed through a rotary transformer or the like attached to the rotary cylinder. The rotary transformer also has the characteristic that the signal of the DC component or low frequency component can hardly be transmitted, similarly to the magnetic head, so that the DC component of the signal is not transmitted.

Therefore, the band compressed image data is not directly recorded but is recorded and reproduced using an interleave NRZI modulating system in which the image data is scrambled using a pseudorandom pattern and the DC component is suppressed, or the like. However, in this case as well, since a small amount of DC component is included in the scrambled image data, in the transmitting system such as the foregoing magnetic head, rotary transformer, or the like in which the DC component cannot be transmitted, a detection error frequently occurs when reproducing the recording pattern of the DC component or low frequency component. Such an increase in error rate results in an inconvenience of deterioration in image quality.

On the other hand, a method whereby the recording is performed after the modulation was performed using various kinds of DC-free recording modulating system is also known. However, for example, in the converting system such as 8-10 block encoding system having no DC component or the like, the redundancy increases and the transmission bit rate rises, so that there is a drawback that high density recording is difficult to achieve. Further, there is also a drawback that to realize such a modulating system, complicated processes are needed and the amount of hardware also increases.

To solve the foregoing problems, the assignee of the present invention has already proposed a prediction encoder in which the CDS (Codeword Digital Sum) of a small value is assigned to the "representation differential value" whose appearance frequency is high, thereby enabling the DSV (Digital Sum Value) of the whole (modulation signal) to be suppressed.

This prediction encoder will now be described hereinbelow with reference to the drawings.

Figure 1:
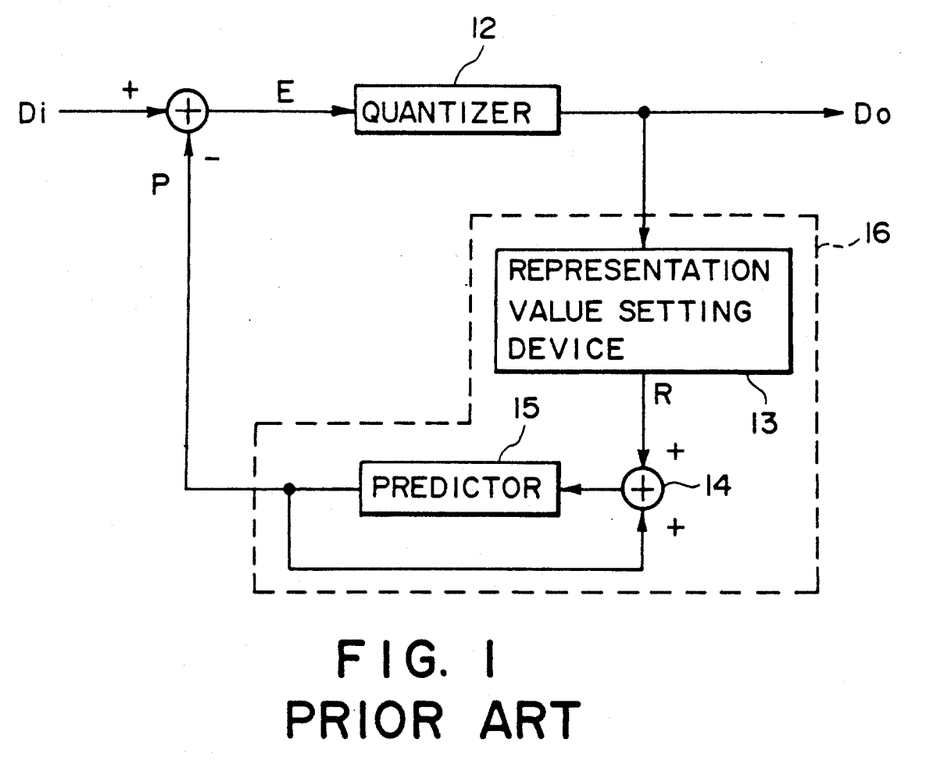
FIG. 1 is a block diagram showing an example of a conventional prediction encoder.

FIG. 1 is a circuit constitutional diagram of the foregoing prediction encoder. In the diagram, reference numeral 11 denotes a subtracter for subtracting a prediction value signal P from an input image signal $D_i$ and generating a prediction error signal E; 12 is a quantizer for receiving the prediction error signal E and obtaining an output data signal $D_o$ (e.g., four bits), which will be explained hereinlater; 13 a representation value setting device having the characteristic opposite to that of the quantizer 12; 14 an adder for adding an output signal from a predictor 15 to a representation value signal R and feeding back the resultant value to the input side of the predictor 15, thereby executing the integrating function; and 16 a local decoder, consisting of the representation value setting device 13, adder 14, and predictor 15, and for generating the prediction value signal P.

The input/output characteristics of the quantizer 12 will now be explained with reference to the table of FIG. 3. Namely, FIG. 3 shows the relation between the level of the prediction error signal E and the bit constitution of the output data signal $D_o$.

Figure 3:
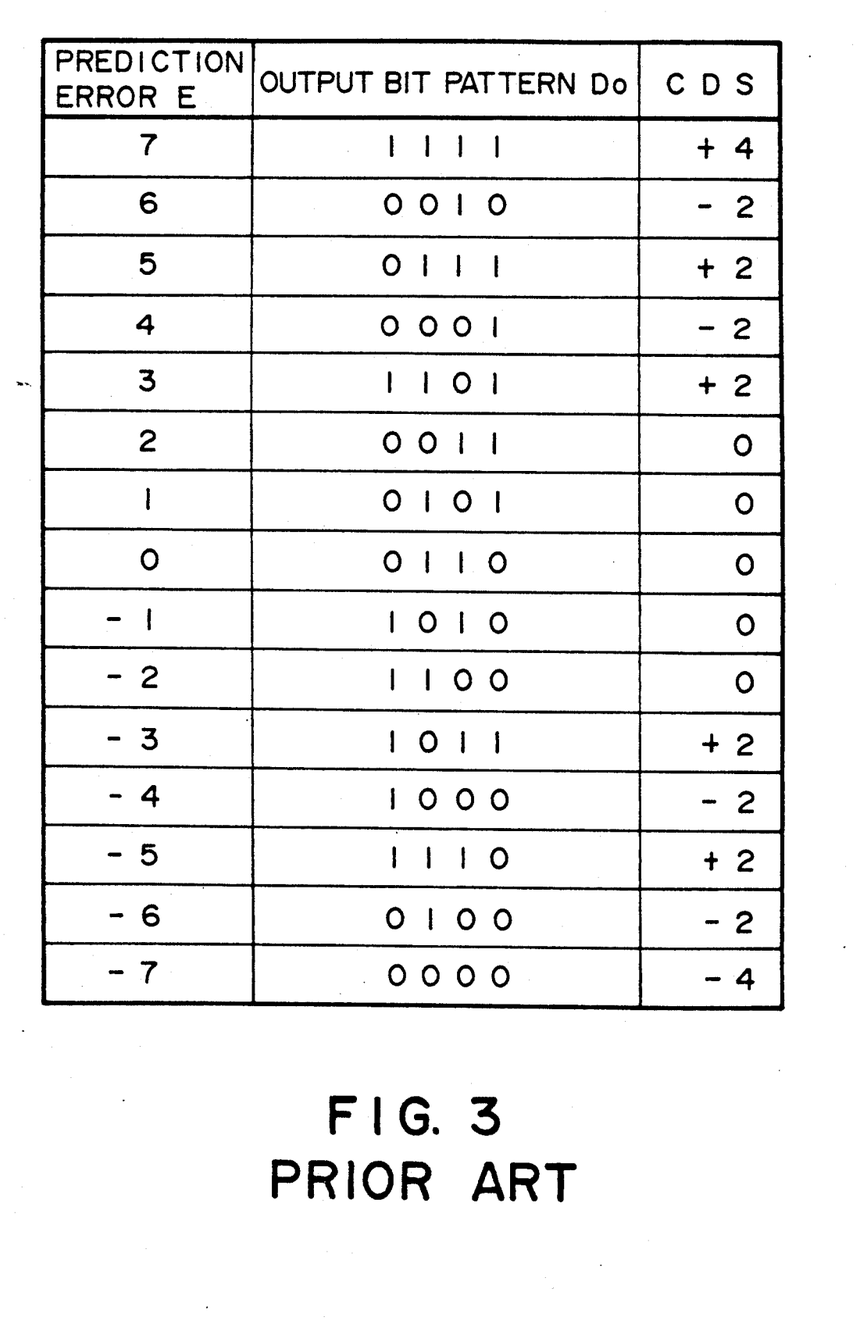
FIG. 3 is a table showing a code assignment to prediction error values.

In the table of FIG. 3, CDS represents the sum of the respective bits in a single code when the level "1" in each bit of the bit pattern in the output data signal $D_o$ is set to "+1" and the level "0" is set to "−1". Therefore, the CDS becomes zero when the sum of the number of "1" is equal to the sum of the number of "0".

Figure 2:
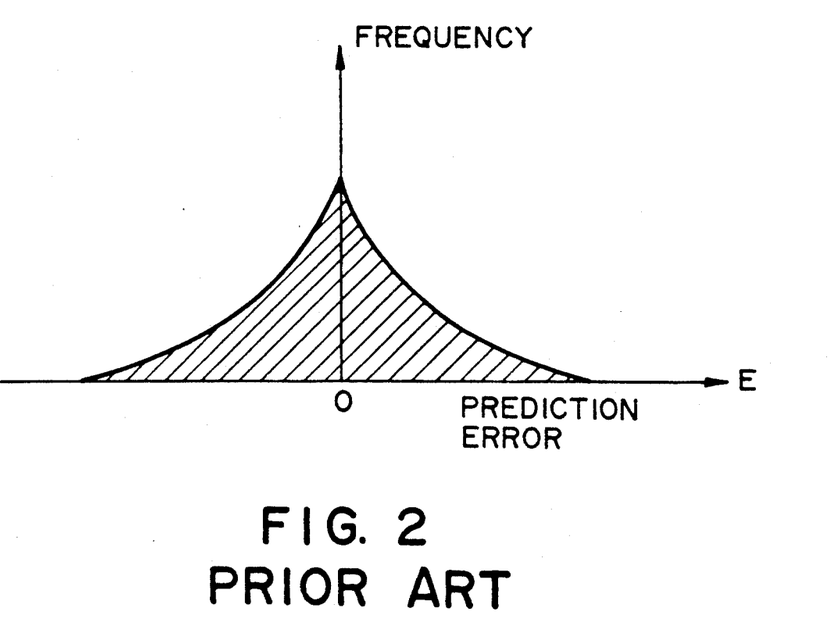
FIG. 2 is a diagram showing an appearance frequency distribution of a prediction error signal.

With respect to the prediction error signal E, as shown in FIG. 2, the statistical phenomenon that a large frequency distribution exists near "0" on the basis of the correlation of the image data is known. Therefore, in the prediction encoder of the present invention, a code is assigned to the range where the value of the prediction error signal E is small so that the absolute value of the CDS becomes small; on the contrary, a code is assigned to the range where the value of the prediction error signal E is large so that the absolute value of the CDS becomes large.

On the other hand, the prediction error signal E is symmetrically distributed around "0" as a center. Therefore, as shown in the table of FIG. 3, with regard to the bit pattern in the output data signal $D_o$, the bit patterns of the prediction error signals having the same absolute value are invertedly arranged. Such an inverted arrangement of the bit patterns will be further described in detail hereinbelow.

For example, when the prediction error is "+3", the output bit pattern is "1101". When the prediction error is "−3", the arrangements of the upper and lower bits are reversed to obtain "1011". At the same time, for "0010" corresponding to the prediction error of "+6", "0100" is set in the case of the prediction error of "−6".

However, "1111" and "0000" are assigned to "+7" and "−7" as the maximum values of the prediction error in this example, respectively. On the other hand, when the prediction error is zero, in addition to "0110", "1001" can be also assigned.

In this manner, by assigning the bit pattern in which the absolute value of the CDS is small to the portion near $E=O$ where the appearance frequency of the prediction error signal E is high, the output data signal $D_o$ having less DC component is obtained.

However, although the low frequency component can be suppressed by forming an encoding signal in which the DSV is suppressed by paying an attention to the appearance frequency of the prediction errors in the foregoing prediction encoder, in order to process an image signal having a high sampling rate such as, e.g., a high definition television signal or the like, higher-efficiency encoding must be accomplished to further compress the integrated transmission band or the low frequency component must be more effectively suppressed to reduce the transmission error rate.

In addition, hitherto, a block encoding using an orthogonal transformation has been known as one of image processing means of the television signal. This encoding relates to a method whereby the whole transmission amount is reduced by transmitting each transforming coefficient after the orthogonal transformation by the transmission amount proportional to its standard deviation.

In the case of digitally transmitting each transforming coefficient, it is digitized and converted into a digital value. However, at this time, the digitization level number of each transforming coefficient is determined so as to assign a value proportional to the standard deviation of the transforming coefficient. The number of bits by which the level number can be expressed as a code is assigned for every transforming coefficient and each transforming coefficient is independently encoded and transmitted.

However, in the foregoing orthogonal transformation encoding, when the number of dividing levels of each transforming coefficient is not 2 N (N being some positive integer), codes which are not effectively used exist among all of the codes which can be expressed by the number of bits assigned to each transforming coefficient and these codes have the redundancy. On the other hand, in the case where an image signal having a high sampling rate such as, e.g., a high definition television signal or the like is recorded by a rotary magnetic recording and reproducing apparatus, it is demanded that the redundancy of the codes be reduced to be as small as possible the DC component be suppressed, and the integrated bit rate be reduced.

SUMMARY OF THE INVENTION

It is an object of the present invention to provide an encoding apparatus which can solve the foregoing problems.

Another object of the invention is to provide an encoding apparatus which can highly efficiently encode an image signal.

To achieve these objects according to one aspect of the present invention, there is provided an encoding apparatus for digitizing and encoding an image signal, comprising: sample signal forming means for receiving the image signal and sequentially sampling the input image signal, thereby forming sample signals at respective sample points, and for sequentially outputting the sample signals; encoding data forming means for sequentially receiving the sample signals which are sequentially output from the sample signal forming means, for forming encoding data which respectively correspond to the input sample signals at the respective sample points, and for outputting the plurality of resultant encoding data every k (k is an integer of 2 or more) encoding data in accordance with an order which is different from the forming order of those encoding data; and data train converting means for converting the k encoding data which are output from the encoding data forming means into the data train having less DC and low frequency components in accordance with a combination of the k encoding data and for outputting this data train.

Still another object of the invention is to provide an encoding apparatus which can convert an image signal into a code train in which the DC and low frequency components are suppressed without adding redundancy bits.

This object is achieved, according to another aspect of the invention, by providing an encoding apparatus for digitizing and encoding an image signal, comprising: sample signal forming means for receiving the image signal and sequentially sampling the input image signal, thereby forming sample signals at respective sample points; differential encoding data forming means for continuously forming differential encoding data corresponding to the differential value between the sample signals at the adjacent sample points on a picture plane with respect to the sample signals at the respective sample points which were formed by the sample signal forming means and for sequentially outputting these differential encoding data; data extracting means for discontinuously extracting k (k is an integer of 2 or more) differential encoding data from the plurality of differential encoding data which are sequentially output from the differential encoding data forming means and for outputting the extracted k differential encoding data; and data converting means for converting the k differential encoding data which were output from the data extracting means into the data having the same number of bits as the total number of bits of the k differential encoding data and having less DC and low frequency components in accordance with a combination of the k differential encoding data and for outputting the converted data.

Still another object of the invention is to provide an encoding apparatus which can suppress the DC and low frequency components when an image signal is orthogonal transformation encoded.

To achieve this object according to another aspect of the invention, there is provided an encoding apparatus for digitizing and encoding an image signal, comprising: sample signal forming means for receiving the image signal every picture plane and sequentially sampling the input image signal, thereby forming sample signals at respective sample points of one picture plane, and for outputting these sample signals; dividing means for dividing the sample signals of one picture plane which are sequentially output from the sample signal forming means every sample signals at adjacent k (k is an integer of 2 or more) sample points on a screen, thereby forming a plurality of groups, and for simultaneously outputting the sample signals at k sample points on a group unit basis; orthogonal transforming means for receiving the sample signals at k sample points which are simultaneously output from the dividing means and respectively orthogonal transforming these sample signals and outputting; digitizing means for receiving the sample signals at k sample points which were orthogonal transformed by the orthogonal transforming means and respectively digitizing these sample signals and simultaneously outputting; and encoding means for encoding the sample signals at k sample points which are output from the digitizing means into the data having less DC and low frequency components in accordance with a combination of the sample signals at k sample points.

The above and other objects, features and advantages of the present invention will become more fully apparent from the following detailed description and the appended claims with reference to the accompanying drawings.

DESCRIPTION OF THE PREFERRED EMBODIMENTS

The present invention will first be described hereinbelow with respect to the first embodiment.

Figure 4:
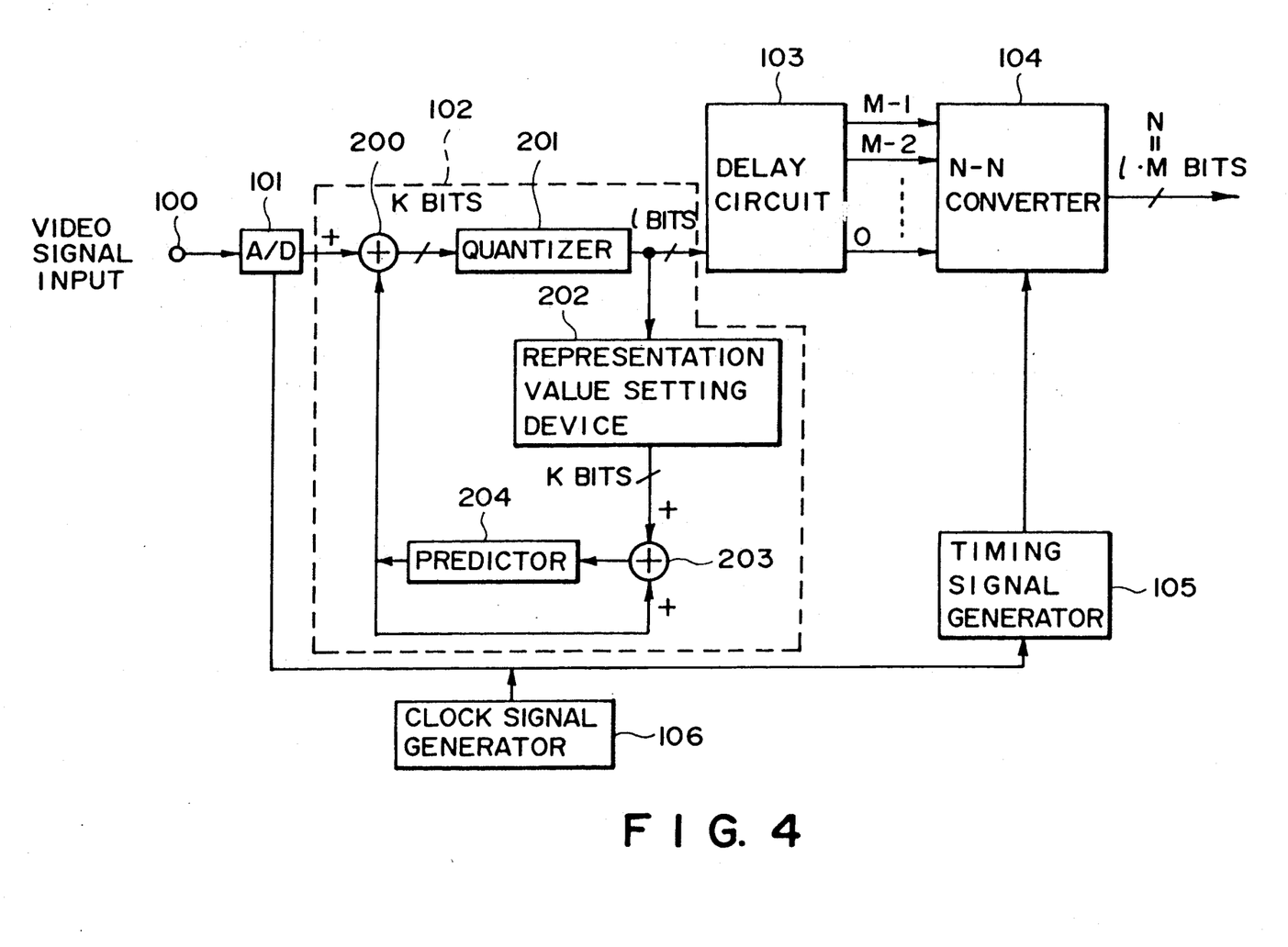
FIG. 4 is a block diagram showing a prediction encoding apparatus to which the present invention is applied, as a first embodiment of the invention.

FIG. 4 shows an embodiment of an encoding apparatus to which the invention is applied.

As shown in FIG. 4, an analog video signal which is input to an input terminal 100 is converted into digital data of k bits by an A/D converter 101. The digital data is input to a DPCM circuit 102 and the difference between the adjacent pixels is calculated to obtain a differential value output. The input data to the DPCM circuit is also supplied to an adder 200. The one-sample preceding output image data generated from a predictor 204 is input as prediction pixel data to the other inverting input terminal of the adder 200.

The adder 200 calculates the difference between the image data of the present sample and the image data of the preceding sample and outputs the resulting differential data as data of k bits. The differential data of k bits from the adder 200 is input to a quantizer 201 and non-linearly digitized using the feature of the image signal.

Practically speaking, a non-linear quantizer in the foregoing prediction encoder (refer to FIG. 1) may be also used. Other general non-linear quantizer can be also used. The differential data of k bits is converted into the differential data of l bits ($l \leq k$) by the non-linear digitization.

The differential data of l bits which is output from the quantizer 201 is distributed into two systems. One system is supplied to a delay circuit 103 and the other system is supplied to a representation value setting device 202 and used to form the prediction value.

The representation value setting device 202 performs the converting operation opposite to that of the quantizer 201. The states of those conversions will be explained with reference to FIG. 6.

Figure 6:
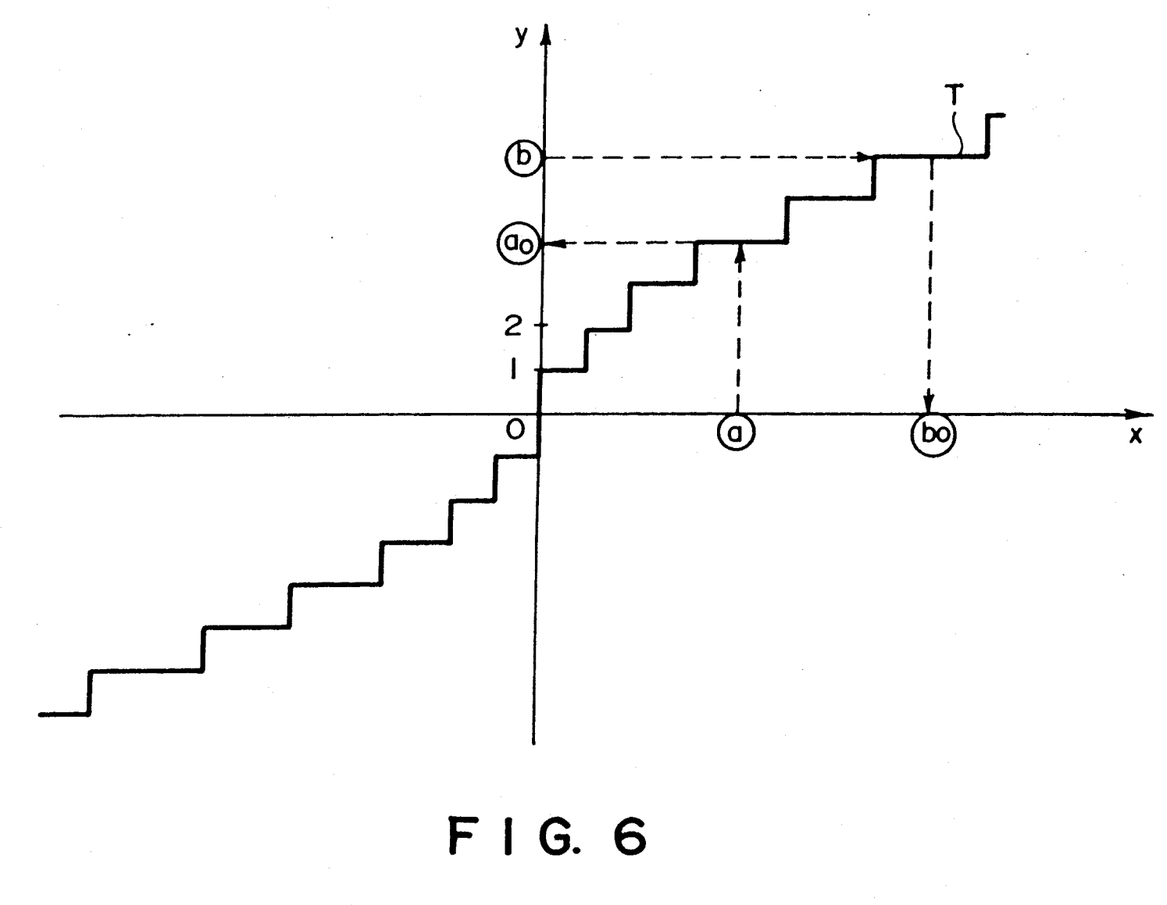
FIG. 6 is a diagram showing a non-linear digitizing characteristic and a representation value setting characteristic.

In the digitization in the embodiment, the input differential data a of k bits on an x axis is first converted into the differential data $a_0$ of l bits by the quantizer 201 in accordance with a transforming function characteristic T. As a result, non-linear digitization is realized. Although digitization errors occur at this time, in order to prevent the accumulation of the digitization errors, the representation value setting device 202 to perform the converting process opposite to that of the quantizer 201 is provided, thereby obtaining decoded differential data of k bits. On the basis of the decoded differential data, the differential value between the present sample data and the next sample data is calculated by the adder 200 using the output image data of the preceding sample including the digitization errors which is formed by an adder 203 and the predictor 204, which will be explained hereinafter. Therefore, the digitization errors are not accumulated.

The foregoing operations will be explained practically. When the differential data b of l bits is output from the quantizer 201, the setting device 202 outputs the data $b_0$ on the x axis as the decoded differential data of k bits from b on the y axis in FIG. 6 in accordance with the transforming function characteristic T. This operation is quite opposite to the digitization.

When the predictor 204 is regarded as a delay circuit of one sample period of time for simplicity of explanation, the output image data of one sample before is supplied to one input terminal of the adder 203. The foregoing decoded differential data is supplied to the other input terminal of the adder 203. Therefore, data representing the same information as that obtained by decoding the output image data of the present sample is derived and provided at an output terminal of the adder 203. The data from the output terminal of the adder 203 is delayed by one sample period by the predictor 204 and supplied to the inverting input terminal of the adder 200.

Figure 7A:
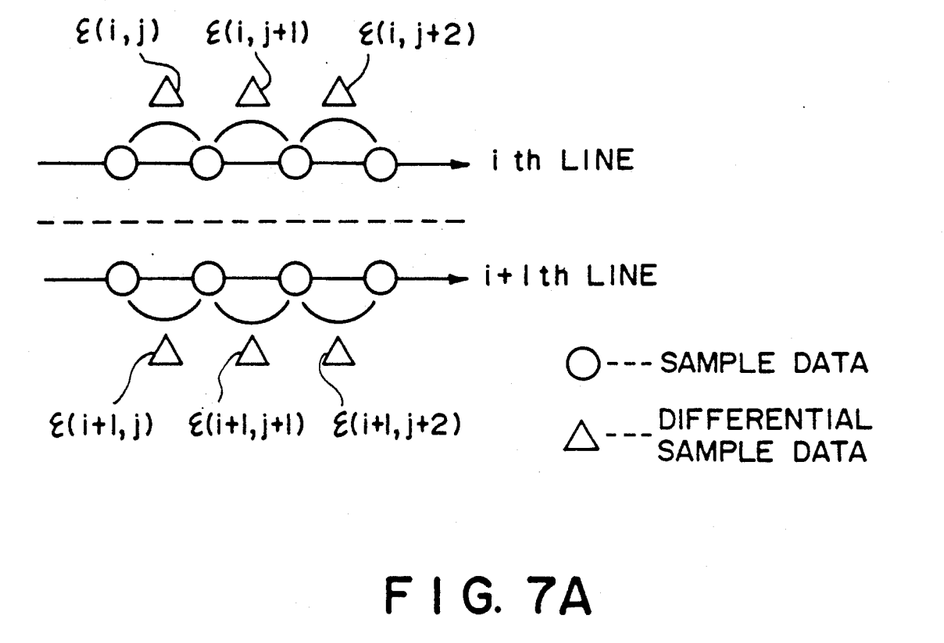
FIGS. 7A and 7B are diagrams showing the relations among the sample points, the differential sample data, and their combinations.

In this manner, the differential value is obtained for every sample. FIG. 7A shows the relation between the differential values and the sample points. In this diagram, in the case of obtaining the image sample data by sampling the image data on the scanning line, the respective differential values are displayed such that $\epsilon(i, j)$ (present), $\epsilon(i, j+1)$ one sample period later), $\epsilon(i-1, j)$ (one line period before), . . . .

Figure 5:
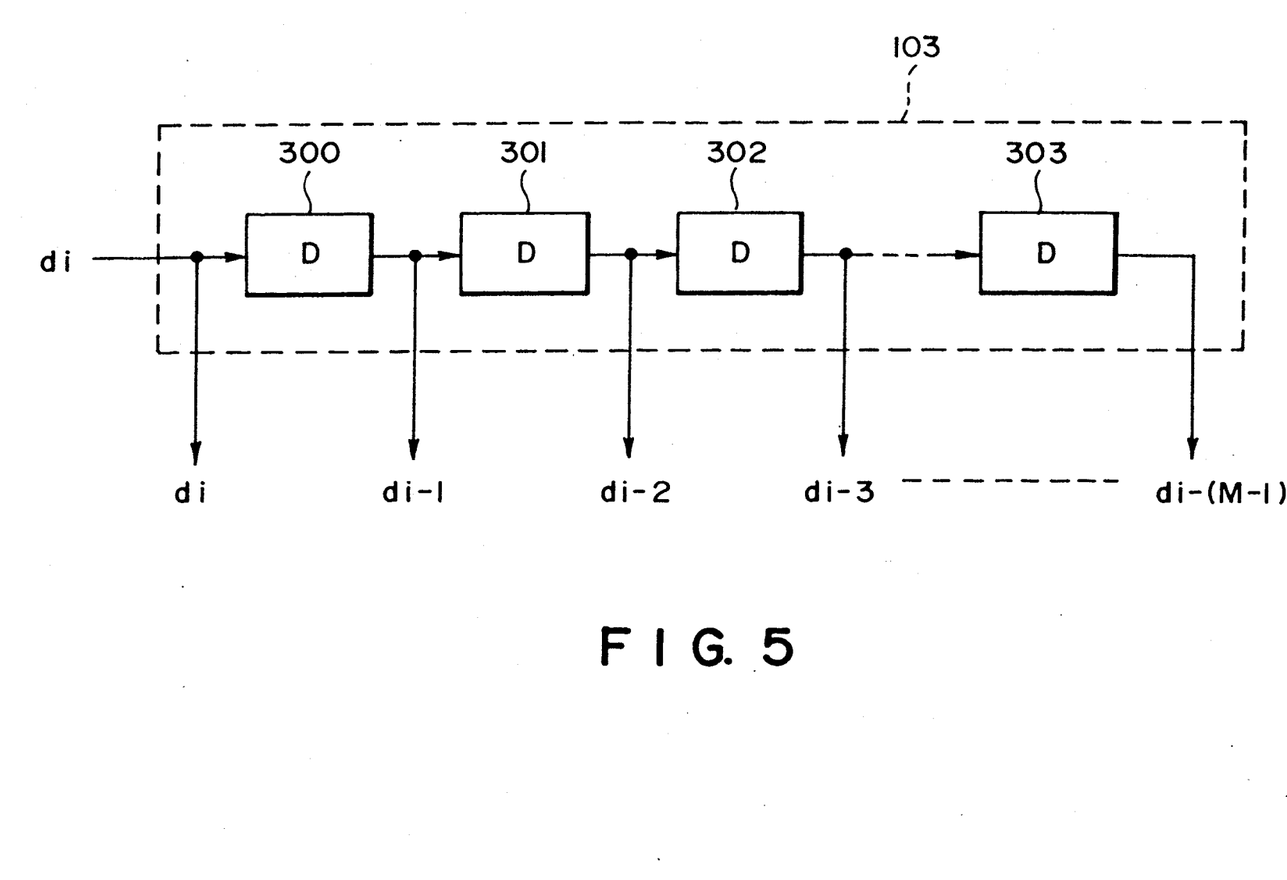
FIG. 5 is a constitutional diagram of a delay circuit in FIG. 4.

The delay circuit 103 for receiving the differential data on an l bit unit basis from the quantizer 201 in FIG. 4 will now be explained. The delay circuit 103 delays the differential data which are continuously input on an l bit unit basis to thereby discontinuously extract the delayed differential data and outputs together the discontinuously extracted differential data every M samples as the N-bit data (the details will be explained hereinbelow). For this purpose, delay circuit elements 300 to 303 each for delaying the differential data of one sample as shown in FIG. 5 are serially connected by M-1 stages, thereby constituting the delay circuit 103. The M differential data which were sequentially delayed by, for example, one horizontal scanning period at a time are output from respective output terminals $d_i$ to $d_{i(M-1)}$ of the delay circuit 103 and N-N converted by an N-N coverted 104. A timing signal generated from a timing signal generator 105 synchronously with a clock signal from a clock signal generator 106 to control the operation of the A/D converter 101 is supplied to the N-N converter 104. The converter 104 performs the N-N conversion on the basis of the timing signal from the timing signal generator 105, so that output data of N (=l·M) bits is derived from the converter 104.

The N-N conversion is performed so as to convert the data of N bits into a code train of N bits having a very small amount of DC and low frequency components by further effectively using the characteristic of the image data which could not be utilized in the nonlinear digitization in the prediction encoder mentioned before (refer to FIG. 1).

Figure 7B:
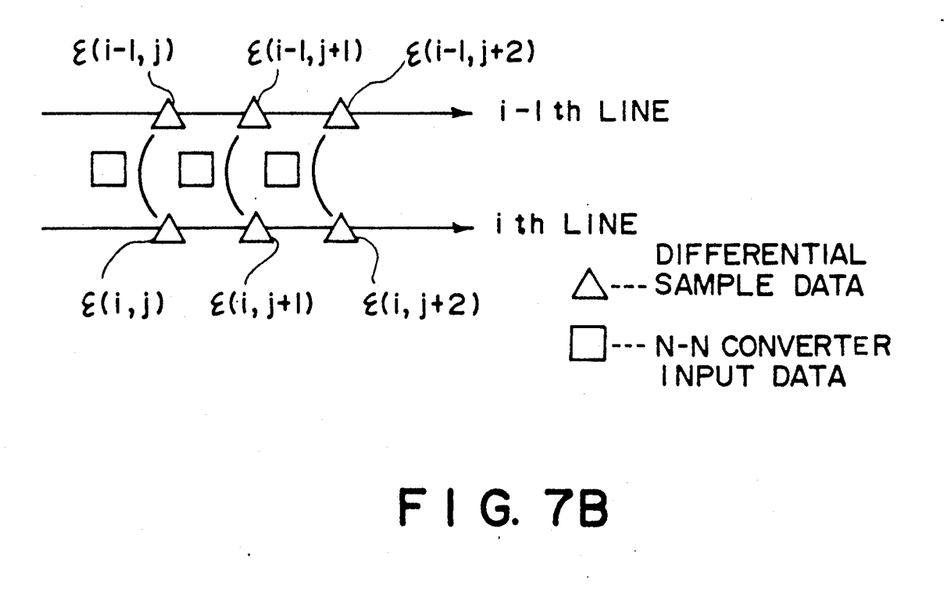
Figure 8:
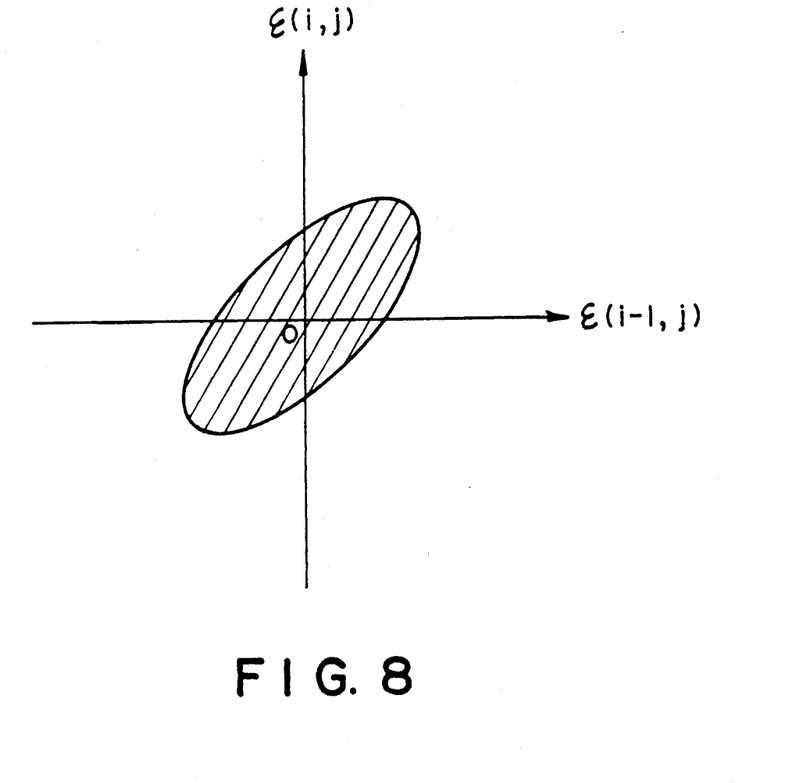
FIG. 8 is a distribution diagram showing an appearance frequency distribution of the combination of the differential sample data.

On the other hand, when the continuous differential sample data in the vertical direction are used as a combination as shown in FIG. 7B as in this embodiment, the distribution is one-sided in the oblique direction of 45° as shown in the hatched region in FIG. 8 due to the correlation among the differential sample data. In this case, the appearance frequency is further concentrated.

Namely, by assigning a code having a small absolute value of the CDS to this region, a code having the small absolute value of CDS easily occurs and encoding which is effective to suppress the low frequency component can be performed.

On the other hand, when the code assignment is executed in this region, by sequentially assigning the codes having the small absolute values of the CDS to the differential sample data whose appearance frequency is higher, the encoding can be still more effectively performed.

The N-N converter 104 can be realized by using a memory to store the output conversion data of the same number of bits corresponding to the input data of N (=l·M) bits.

Thus, the encoding data train in which the DSV is efficiently controlled and the low frequency component is sufficiently suppressed and no redundancy bit exists can be obtained from the N-N converter 104.

In this embodiment, although the DPCM has been used as the previous value prediction, it is not limited to this prediction. On the other hand, although two continuous differential data in the vertical direction on the screen have been converted into a single conversion code upon encoding, the suppressing effect of the DC and low frequency components can be also improved by a method whereby the data having the strong correlation in the direction other than the vertical direction, for example, the differential sample data of the preceding field or preceding frame and the differential sample data of the present field or present frame are combined to form one unit or a method whereby two or more differential sample data are combined to form one unit.

Figure 9:
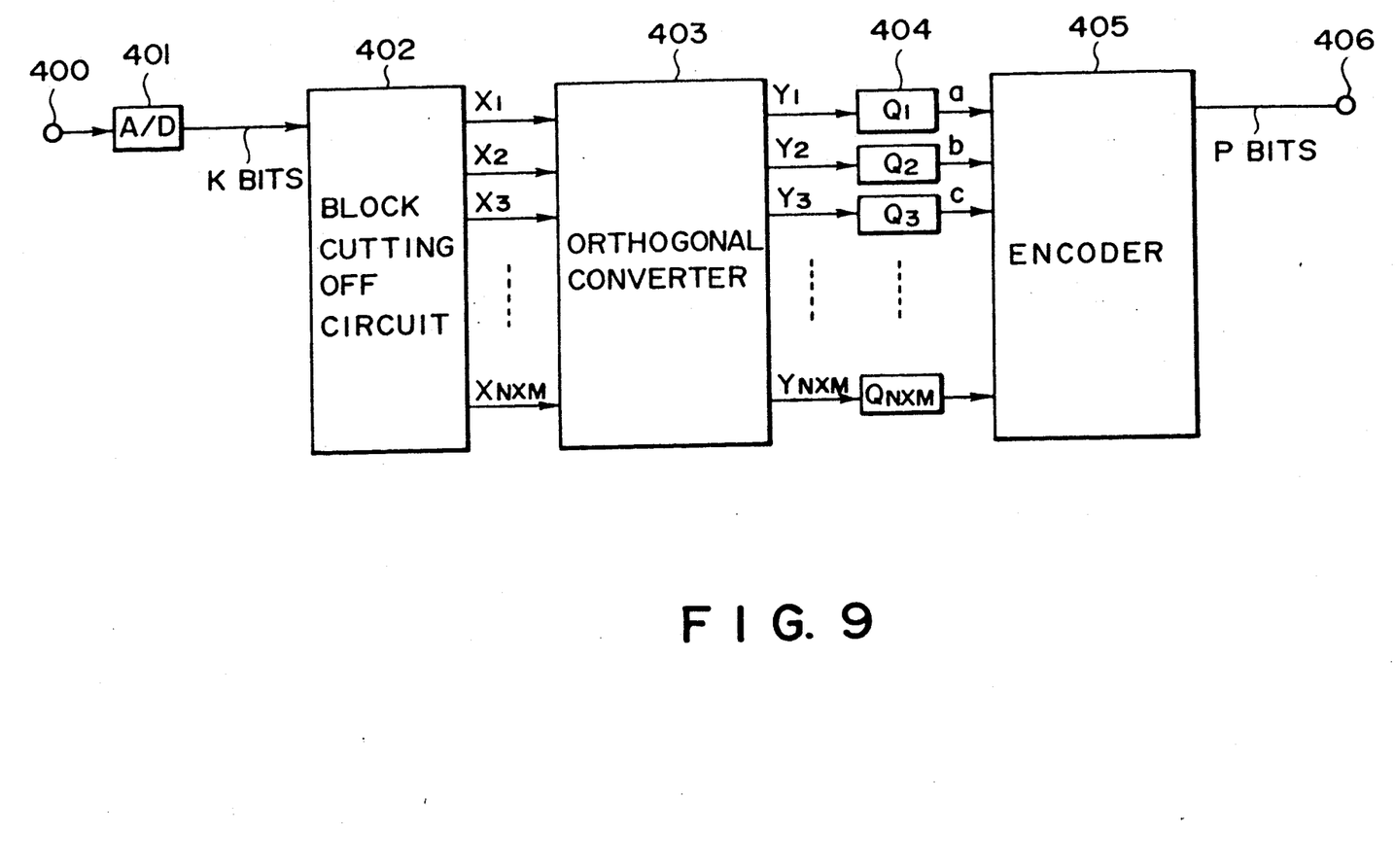
FIG. 9 is a block diagram showing an encoding apparatus to which the invention is applied, as a second embodiment of the invention.

FIG. 9 is a diagram showing a schematic constitution of an encoding apparatus, to which the invention is applied, as the second embodiment of the invention.

In the encoding apparatus of this embodiment, an input video signal is converted into digital data of k bits per pixel and orthogonal transformed on a block unit basis consisting of N×M pixels, each of the N×M transforming coefficients obtained is digitized to obtain the encoding data, and these encoding data are together converted into code of P ($\leq$N×M×k) bits and are output.

Figure 10:
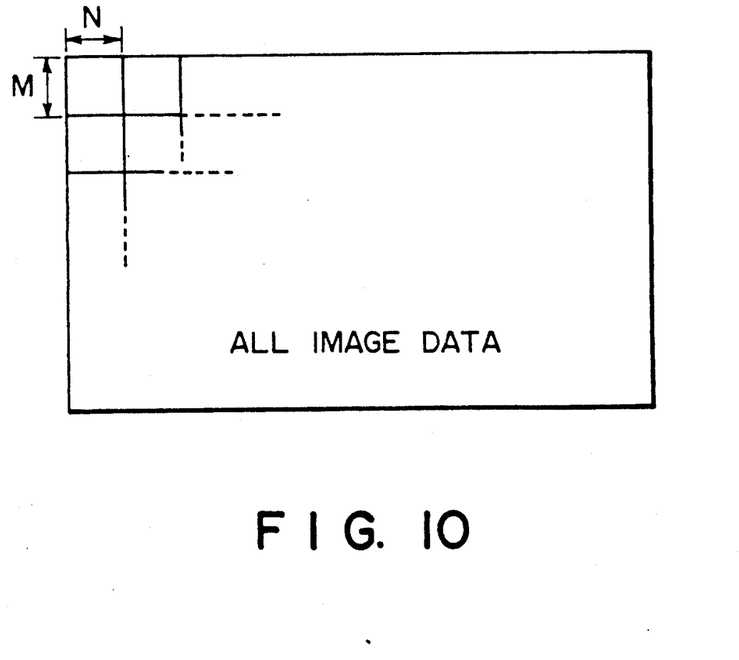
FIG. 10 is a diagram showing a state in which all pixels are divided into pixel blocks each consisting of a plurality of pixels.

As shown in FIG. 9, an analog video signal which is input from an input terminal 400 is supplied to an A/D converter 401 and converted into the digital data of k bits. This digital data is input to a block cutting off circuit 402 and divided into pixel blocks each of which is constituted by N×M pixels consisting of N pixels in the horizontal direction and M pixels in the vertical direction and is output as shown in FIG. 10.

Figure 11:
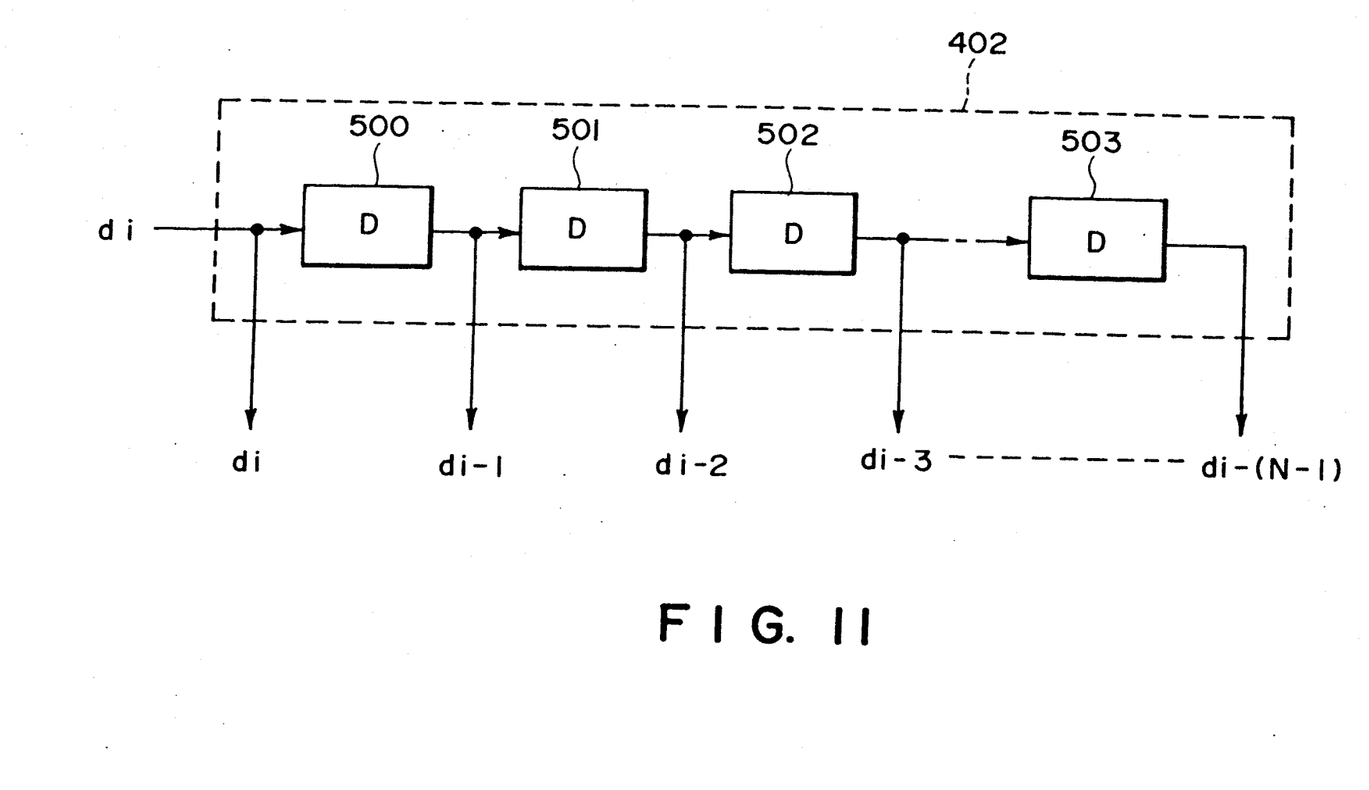
FIG. 11 is a diagram showing an example of a constitution of a block cutting off circuit in FIG. 9.

FIG. 11 shows an example of the block cutting off circuit. This diagram shows the case where M is set to 1 and continuous N pixels are handled as one block. The block cutting off circuit of FIG. 11 is constituted by serially connecting (N−1) delay circuit elements 500 to 503 each for delaying each pixel data. The data which is continuously input is delayed by each delay circuit element by every one sample period of time. The N delayed data are together output from output terminals $d_i$ to $d_{i(N-1)}$, thereby cutting off a block.

The data which was output on a block unit basis consisting of N×M pixels as explained above is input to an orthogonal converter 403 and converted into (N×M) transforming coefficients. The orthogonal converter 403 multiplies an expansion coefficient to the input data to thereby calculate a transforming coefficient Y by an ordinary orthogonal transforming method such as a Hadamard transformation, discrete cosine transformation, or the like.

The (N×M) transforming coefficients obtained by the orthogonal converter 403 are independently input to a quantizer 404 and digitized to predetermined digitization level numbers, respectively, so that the encoding data are obtained. The digitization level number of each quantizer is decided by the value proportional to the standard deviation of each transforming coefficient which is derived by the orthogonal transformation.

Each transforming coefficient digitized by the quantizer 404 is input to an encoder 405. The encoder 405 does not independently convert each transforming coefficient into the code but outputs the code of P bits in correspondence to a combination of the respective transforming coefficients which are input. Further, for the combinations of the transforming coefficients, the CDS of a small absolute value is assigned to the combination whose appearance frequency is high, thereby encoding so that the whole low frequency component of the output signal train can be suppressed. The encoded data is sent to an output terminal 406.

The difference between the case where each transforming coefficient was independently converted into the code and the case where a plurality of transforming coefficients were together converted into the codes will now be explained.

Assuming that the digitization level numbers of the respective transforming coefficients are set to a, b, c, d, ..., the numbers of bits h, i, j, k, ... which are necessary for the respective transforming coefficients when independently converting into the code become the minimum numbers which satisfy $a \leq 2^h$, $b \leq 2^i$, $c \leq 2^j$, $d \leq 2^k$, ..., respectively. Therefore, the total number of output bits P of the encoder becomes P=h+i+j+k+ . . . .

However, the number of input patterns which are actually input to the encoder is $a \times b \times c \times d \times \ldots$. When each of digitization level numbers is not limited to the number which is expressed by the number of power of 2, the relation $2^p > a \times b \times c \times d \times \ldots$ is generally obtained. Therefore, the number of patterns which are needed when converting into the code in the output patterns of P bits is $a \times b \times c \times d \times \ldots$, so that $\{2^p - (a \times b \times c \times d \times \ldots)\}$ non-appearing patterns exist.

In the case of together converting the respective transforming coefficients into codes as in present embodiment, the worst pattern (the code including the largest amount of low frequency component) in the P-bit code is made to correspond to the non-appearing pattern, so that the signal whose low frequency component was further suppressed that the case of independently converting into the code can be transmitted to the output terminal 406.

In this embodiment, the case where the N×M transforming coefficients are together converted into the codes has been shown. However, the effect near that in the present embodiment can be also realized even if encoders less in number than N×M were used.

On the other hand, the example in which the respective transforming coefficients were digitized using the individual (N×M) quantizers has been described in detail. However, by commonly setting the digitization level number and the digitizing characteristic, the digitization can be also realized by the quantizers of the number less than N×M.

Further, although the orthogonal transformation has been used as the means for block encoding in the embodiment, other means can be also used.

We claim:

1. An encoding apparatus for digitizing and encoding an image signal, comprising:
   (A) sample signal forming means for receiving the image signal and sequentially sampling the input image signal, thereby forming sample signals at respective sample points;
   (B) differential encoding data forming means for continuously forming differential encoding data corresponding to a differential value of the sample signals of the adjacent sample points on a screen for the sample signals at the respective sample points which were formed by said sample signal forming means and for sequentially outputting said differential encoding data;
   (C) data delaying means for delaying said plurality of differential encoding data which are sequentially output from said differential encoding data forming means and for simultaneously outputting m discontinuous differential encoding data, wherein m is an integer equal to or greater than 2; and
   (D) data converting means for converting said m differential encoding data which are output from said data delaying means into data having the same number of bits as the total number of bits of said m differential encoding data and having less DC and low frequency components in accordance with a combination of the m differential encoding data and for outputting said data converted by said converting means.

2. An encoding apparatus according to claim 1, wherein said sample signal forming means includes an analog-to-digital converter for sampling the input image signal at a predetermined frequency and outputting sample data of k bits as said sample signals, and said k is a positive integer.

3. An encoding apparatus according to claim 2, wherein said differential encoding data forming means includes a prediction differential encoding circuit for continuously forming, as said differential encoding data, prediction differential encoding data of l(l being a positive integer with l<k) bits from the sample data of k bits which is output from said analog-to-digital converter and for sequentially outputting said prediction differential encoding data, wherein l is a positive integer smaller than k.

4. An encoding apparatus according to claim 1, wherein said data converting means includes a memory circuit in which conversion data of the same number of bits as the total number of bits of said m differential encoding data which are output from said data delaying means is stored in correspondence to the bit pattern of the m differential encoding data, and said memory circuit is arranged so as to output said conversion data corresponding to the bit pattern of the m input differential encoding data.

5. An encoding apparatus according to claim 1, wherein said data delaying means is arranged so as to delay the m differential encoding data corresponding to the sample signals at the adjacent sample points in the vertical direction on the screen for the plurality of differential encoding data which are sequentially output from said differential encoding data forming means.

6. An encoding apparatus according to claim 1, wherein said data delaying means is arranged so as to extract the m differential encoding data corresponding to the sample signals at the adjacent sample points in the time direction on the screen for the plurality of differential encoding data which are sequentially output from said differential encoding data forming means.

7. An encoding apparatus for digitizing and encoding an image signal, comprising:
   (A) analog-to-digital converting means for receiving the image signal picture plane by picture plane and sampling the received image signal according to a predetermined sampling frequency, thereby converting a sample signal at each sample point, which is provided by sampling the image signal of one picture plane into sample data of k bits, and outputting said sample data;
   (B) dividing means for dividing the sample data of one picture plane which are sequentially output from said analog-to-digital converting means every sample data at m adjacent sample points on a screen, thereby forming a plurality of groups, and for simultaneously outputting the sample data at m sample points on a group unit basis, wherein m is an integer equal to or greater than 2;
   (C) orthogonal transforming means for receiving the sample data at m samples which are simultaneously output from said dividing means and for respectively orthogonally transforming said input sample data and for outputting the results of such orthogonal transformation;
   (D) digitizing means for receiving the sample data at m sample points which were orthogonally transformed by said orthogonal transforming means and for respectively digitizing said input sample data and for simultaneously outputting them; and
   (E) encoding means for encoding the sample data at m sample points which are output from said digitizing means into data of P bits having less DC and low frequency components in accordance with a combination of the sample data of m sample points, wherein P is a positive integer equal to or smaller than k×m.

8. An encoding apparatus according to claim 7, wherein said dividing means is arranged for dividing the sample data of one picture plane which are sequentially output from said analog-to-digital converting means every sample data at m sample points consisting of i adjacent sample points in a horizontal direction in the picture plane and j adjacent sample points in a vertical direction in the picture plane, thereby forming a plurality of groups, and to simultaneously output the sample data at m sample points on a group unit basis, wherein m is equal to i×j, i and j being positive integers.

9. An encoding apparatus according to claim 7, wherein said encoding means is arranged so as to further encode by assigning data of P bits having a bit pattern in which the number of continuous bits indicative of "0" or "1" is small to a combination whose appearance frequency is high among the combinations of the sample data at m sample points.

10. An encoding apparatus according to claim 7, wherein said dividing means includes a delay circuit for delaying the sample data of one picture plane which are sequentially output from said analog-to-digital converting means and for simultaneously outputting the sample data at m adjacent sample points on the screen.

11. An encoding apparatus for digitizing and encoding an image signal, comprising:

(A) sample signal forming means for receiving the image signal and sequentially sampling the input image signal, thereby forming sample signals at respective points, and for sequentially outputting said sample signals;

(B) differential encoding means for continuously forming encoding data corresponding to a differential value of the sample signals at adjacent sample points at adjacent sample points on the screen for the sample signals at the respective sample points which are sequentially input from said sample signal forming means and for sequentially outputting;

(C) data delaying means for receiving said plurality of differential encoding data which are sequentially output from said differential encoding means, for delaying the plurality of differential encoding data which are sequentially input, and for simultaneously outputting discontinuous m differential encoding data in accordance with an order different from the input order, wherein m is an integer equal to or greater than 2; and (D) data train converting means for converting said m encoding data which are output from said data delaying means into a data train having less DC and low frequency components in accordance with a combination of the m encoding data and for outputting said data train.

12. An encoding apparatus for digitizing and encoding an image signal, comprising:

(A) sample signal forming means for receiving the image signal and sequentially sampling the input image signal, thereby forming sample signals at respective points, and for sequentially outputting the sample signals;

(B) data delaying means for delaying the sample signals of one picture plane which are sequentially input from said sample signal forming means and for simultaneously outputting the sample signals at m adjacent sample points on the screen, wherein m is an integer equal to or greater than 2;

(C) orthogonal-transformation encoding means for receiving the sample signals at m sample points which are simultaneously output from said data delaying means and for respectively orthogonal-transformation encoding the input sample signals and for outputting the results of such orthogonal-transformation encoding; and (D) data train converting means for receiving at a time all of the m encoding data which are output from said orthogonal-transformation encoding means and then converting the received m encoding data into a data train having less DC and low-frequency components in accordance with a combination of the received m encoding data, and for outputting the data train.

* * * * *

UNITED STATES PATENT AND TRADEMARK OFFICE
CERTIFICATE OF CORRECTION

PATENT NO. : 5,043,809
DATED : August 27, 1991
INVENTOR(S) : AKIHIRO SHIKAKURA ET AL.      Page 1 of 2

It is certified that error appears in the above-indentified patent and that said Letters Patent is hereby corrected as shown below:

TITLE PAGE:

AT [54] TITLE

"ENCODING APPARATUS" should read
--DIGITAL DATA ENCODING APPARATUS--.

AT [56] REFERENCES CITED

U.S. Patent Documents,
"Jari et al." should read --Juri et al.--.

COLUMN 1

Line 2, "ENCODING APPARATUS" should read
--DIGITAL DATA ENCODING APPARATUS--.
Line 38, "change" should read --change of--.

COLUMN 3

Line 8, "E=O" should read --E=0--.
Line 13, "an" should be deleted.
Line 62, "objects according" should read
--objects, according--.

COLUMN 4

Line 42, "object according" should read
--object, according--.

COLUMN 6

Line 60, "∈(i, j+1) one" should read --∈(i, j+1) (one--.

UNITED STATES PATENT AND TRADEMARK OFFICE
CERTIFICATE OF CORRECTION

PATENT NO. : 5,043,809
DATED : August 27, 1991
INVENTOR(S) : AKIHIRO SHIKAKURA ET AL.      Page 2 of 2

It is certified that error appears in the above-indentified patent and that said Letters Patent is hereby corrected as shown below:

COLUMN 10

Line 11, "data, wherein 1 is a positive integer smaller" should read --data.--.
Line 12, "than k." should be deleted.
Line 32, "extract" should read --delay--.
Line 45, "k bits," should read --k bits (k being a positive integer),--.
Line 61, "digitizing means" should read --quantizing means--.
Line 62, "were" should read --are--
Line 64, "digitizing" should read --quantizing--.
Line 67, "digitiz-" should read --quantiz---.

COLUMN 11

Line 41, "at adjacent sample points" should be deleted.

Signed and Sealed this

Twenty-ninth Day of October 1996

Attest:

BRUCE LEHMAN

*Attesting Officer*     *Commissioner of Patents and Trademarks*